United States Patent Office 2,708,661
Patented May 17, 1955

2,708,661

PREPARATION OF PLASTICS IN CELLULAR FORM

Robert L. Frank, Lake Geneva, Wis., assignor to Ringwood Chemical Corporation, Ringwood, Ill., a corporation of Illinois No Drawing. Application July 12, 1952,
Serial No. 298,633

5 Claims. (Cl. 260—2.5)

My copending application, Serial Number 206,919, filed January 19, 1951, now Patent No. 2,676,928, (the present application being in part a continuation of said copending application), describes and claims the production of cellular products from natural and synthetic plastic materials by the alkali promoted decomposition of N-nitroso beta amino ketones incorporated in said plastic materials.

I have now found that cellular products can be produced from natural and synthetic plastic materials by the acid promoted decomposition of N-nitroso beta amino ketones incorporated in said plastic materials.

One object of my invention is to provide an improved method for the preparation of cellular products.

Another object of my invention is to provide an improved method for the preparation of cellular products from plastic materials.

An additional object of my invention is to provide an improved method for the production of cellular products from synthetic plastic materials.

A further object of my invention is to provide an improved method for the production of cellular products from natural plastic materials.

Yet another object of my invention is to provide improved blowing compositions effective for the production of cellular products from natural and synthetic plastic materials.

Additional objects of my invention will become apparent as the description thereof proceeds.

In my copending application, above referred to, the various methods employed in the production of cellular products from natural and synthetic plastic materials and the properties and uses of said cellular products are described in some detail. Also, said copending application describes in some detail the combination of properties desired in an ideal blowing agent and lists the advantages and disadvantages of the more important known blowing agents. Finally, said copending application describes in some detail a few of the various methods that may be employed to synthesize the N-nitroso beta amino ketone blowing agents used in the practice of my invention.

In view of the detailed consideration in my copending application, above referred to, of the subjects listed in the previous paragraph and matters ancillary thereto, repeating such material here would be surplusage. However, to avoid the necessity of referring to said copending application for a complete understanding of my invention, one general method for the synthesis of N-nitroso beta amino ketones is here given including a specific example of this particular synthetic method.

N-nitroso beta amino ketones may be prepared by first reacting an alpha olefine-ketone with a primary amine. The primary amine adds to the double bond of the alpha olefine-ketone as usual, the nitrogen atom of the primary amine becoming attached to the beta carbon atom of the alpha olefine-ketone to form a beta amino ketone (which is a secondary amine since the nitrogen atom also carries the radical of the original primary amine). A salt (e. g. the hydrochloride, acetate or sulfate) of the beta amino ketone is formed and this salt is then converted to the N-nitroso derivative of the beta amino ketone by conventional methods, for example, by treatment of the salt with sodium nitrite.

In my copending application, above referred to, specific descriptions are given for the preparation of N-isopropyl N-nitroso diacetone amine (INDA), N-methyl N-nitroso diacetone amine (MNDA), N-nitroso triacetone amine (N-nitroso 2,2,6,6-tetramethyl 4-piperidone, NTA) and many other N-nitroso beta amino ketones. Here, to complete the disclosure of a suitable synthetic method but at the same time to avoid repetition of material found in said copending application, the preparation of N-ethyl N-nitroso diacetone amine (ENDA) will be described.

Twenty three and two-tenths pounds of a 70.7% aqueous solution of ethyl amine is stirred and cooled to 5° C. To the resulting chilled solution is added slowly, with stirring and cooling, 35.5 pounds of mesityl oxide (2-methyl 2-pentene-4-one, an alpha amino ketone), the temperature being maintained in the range 5–20° C. during the addition of the mesityl oxide. After addition of the mesityl oxide is complete, stirring is discontinued and the reaction mixture is allowed to stand without cooling for 30 minutes to several hours.

The resulting N-ethyl diacetone amine (which is a secondary amine and a beta amino ketone) is then stirred and cooled to 10° C. following which 23.7 pounds glacial acetic acid is added slowly with stirring, cooling being applied to keep the temperature below 15° C. Cooling is then discontinued and an additional quantity of 14.2 pounds glacial acetic acid is added rapidly, the temperature increasing to around 25° C.

The resulting N-ethyl diacetone amine acetate is converted to the N-nitroso derivative by the slow addition, with stirring and sufficient cooling to maintain the temperature in the range 30–35° C., of 30.7 pounds sodium nitrite dissolved in seven gallons of water. After addition is complete, stirring is continued for as long as cooling is necessary to prevent an increase in temperature following which the mixture is allowed to stand at room temperature for six hours or more.

The lower aqueous phase of the reaction mixture is withdrawn and discarded. The upper dark yellow organic layer (62 pounds) is crude N-ethyl N-nitroso diacetone amine (ENDA) of approximately 80% purity (as determined by decomposition and measurement of the nitrogen evolved). If desired, pure ENDA may be obtained by vacuum distillation of the crude material (B. P. 114° C./0.5 mm.) but the 80% crude product is eminently suitable for use as a blowing agent.

It has long been known that N-nitroso beta amino ketones decompose when heated with alkali (for example, when heated in an alcohol solution with sodium ethylate) with the evolution of nitrogen. As set forth in my copending application, previously referred to, I have discovered the surprising fact that on incorporating N-nitroso beta amino ketones and an alkaline promoter into a plastic mass and heating, the resulting decomposition reaction satisfies the extremely critical requirements necessary for a satisfactory blowing agent. Within the temperature range conventionally employed in the processing of natural and synthetic plastic materials, the alkali promoted decomposition of N-nitroso beta amino ketones proceeds smoothly and at the required rate to give an excellent "blow" and the decomposition reaction is sufficiently powerful to "blow" even the stiffest of compositions. Untold thousands of compounds can be decomposed with the evolution of gas but only rarely will such decomposition reactions occur smoothly in the conventional temperature range of plastic processing at the proper rate and with the proper force to "blow" such plastics in a satisfactory manner.

I have also discovered that N-nitroso beta amino ketones decompose when heated in the presence of acidic materials and have further discovered the surprising fact that this acid promoted decomposition of N-nitroso beta amino ketones satisfies the extremely critical requirements necessary for a satisfactory blowing agent.

The following illustrative but non-limiting examples describe the production of cellular products from various natural and synthetic plastic materials by the acid promoted decomposition of N-nitroso beta amino ketones.

*Examples 1-7*

Mixtures having the compositions shown in the table (in parts by weight) were charged to a stainless steel mold, the mold being filled to 87.5% of its capacity. The mold was closed, top and bottom, with cardboard gaskets covered with aluminum foil. The resulting assembly was placed between the platens of a hydraulic press and high pressure was applied following which the assembly was heated to 160° C. and held at this temperature 30 minutes. After cooling under pressure to 50° C., pressure was released and the mold opened. The plastic immediately increased in volume several fold and was immersed in water heated to 80° C. for 20 minutes during which time further expansion occurred.

In those instances where the blowing mixture contained an incompletely soluble solid (e. g. the sulfanilic acid of Example 2) the solid was finely pulverized before incorporating in the mix.

propyl N-nitroso diacetone amine (54% strength) 50 parts, promoted with 33 parts sulfanilic acid was used to blow the plasticized and stabilized plastic by the method previously described. The product resulting had a density of eight pounds per cubic foot and was a soft, ochre colored material of fine pore size.

*Example 10*

Polyvinyl chloride (140 parts by weight) plasticized with dioctyl phthalate (60 parts by weight) and stabilized with 2 parts basic lead carbonate was blown as previously described, using 60 parts N-nitroso triacetone amine promoted with 24 parts glacial acetic acid. A tan product having a density of about 7 pounds per cubic foot was obtained.

*Example 11*

A mixture of 10 g. powdered polyvinyl alcohol, 50 ml. 37% formaldehyde solution and 50 cc. methanol was heated on a steam bath for one hour. Twelve grams of the resulting viscous reaction mixture were thoroughly mixed with 2 g. ENDA (80% strength) following which a promoter made by mixing 1 ml. methanol and 1 ml. concentrated sulfuric acid was thoroughly incorporated in the mixture. The resulting dough like mass expanded twelve fold in volume over a period of 48 hours at room temperature giving a firm and rubbery foam which maintained its size and shape as long as it was retained in the container in which it was formed. On removing from the container and exposing to air some tendency to shrink was observed.

*Example 12*

A mixture of 20 g. phenol, 25 ml. 37% formaldehyde solution and 0.5 g. sodium hydroxide (dissolved in 1 ml.

| Example | 1 | 2 | 3 | 4 | 5 | 6 | 7 |
|---|---|---|---|---|---|---|---|
| Polyvinyl chloride | 47 | 40 | 35 | 25 | 43 | 42 | 43. |
| Dioctyl phthalate | 36 | 32 | 27 | 27 | 33 | 32 | 33. |
| Basic lead carbonate | | 0.1 | | | | | |
| ENDA, 80% strength | 17.5 | 16 | 13 | 13 | 16 | 16 | 16. |
| Promoter | None | 10 (a) | 8 (b) | 6 (c) | 7 (d) | 10 (e) | 7 (f). |
| Properties of Product: | | | | | | | |
| Lbs./Cu. Ft | 17 | 8 | 10 | 7 | 6 | 7 | 7. |
| Color | Light brown | Ochre | Dark brown | Light brown | Light tan | Light brown | Light tan. |
| Pore size | Medium | Fine | Large 1-2 mm | Large | Fine | Medium | |

Promoters:
 (a) Sulfanilic acid
 (b) Beta naphthol
 (c) Glacial acetic acid.
  Equimolecular quantities of benzoic or salicylic acid gave similar results.
 (d) Saccharin
 (e) Mercaptobenzothiazole
 (f) 2-aminoethyl sulfuric acid.

It will be noted that in the absence of an acidic promoter (Example 1) some blowing is obtained but the expansion is very much greater in the presence of an acidic substance (Examples 2-7). The wide variety of acidic substances that may be used as promoters in Examples 2-7, including carboxylic acids, naphthols, mercaptans, sulfimides and monoesters of dibasic inorganic acids, give expanded materials with a bulk density of 6-10 pounds per cubic foot.

*Example 8*

A mixture of 40 parts polyvinyl chloride, 26 parts tricresyl phosphate, 18 parts ENDA (80%) and 10 parts sulfinilic acid, when processed as previously described, gave an expanded plastic with a density of six pounds per cubic foot. The product would char when exposed to a flame but would not continue to burn when removed from the flame.

*Example 9*

Here the polyvinyl chloride (100 parts by weight) was plasticized with a mixture of dioctyl phthalate and dioctyl adipate (30 parts by weight of each), and was stabilized with 2 parts basic lead carbonate. N-isowater) was heated 30 minutes at 80-90° C. and then allowed to stand 24 hours.

A second syrup was prepared in the same manner as above described using however 10 g. p-tert. butyl phenol, 18 ml. 37% aqueous formaldehyde solution and 0.3 g. sodium hydroxide (dissolved in 0.5 ml. water).

Three grams of each of the two syrups described above and 3 g. ENDA (80%) were mixed and a cooled mixture of 0.5 ml. methanol and 0.5 ml. concentrated sulfuric acid was stirred into this mixture. The aqueous layer was decanted and the organic layer was poured into a container. After about 24 hours an eight fold expansion occurred giving a foam weighing 3.7 pounds per cubic foot. The product was brown in color, hard, and somewhat brittle.

*Example 13*

Four grams of the phenol-formaldehyde syrup of Example 12 and 2 g. of the p-tert. butyl phenol-formaldehyde syrup of Example 12 were mixed with 2 g. ENDA (80%). There was thoroughly incorporated into the resulting mixture a cooled promoter consisting of 0.5 ml. methanol and 0.5 ml. concentrated sulfuric acid. When processed as described in Example 12, a light brown, hard and somewhat brittle foam having a density of 7.5 pounds per cubic foot was obtained.

Example 14

The following formulation was prepared by standard procedures (parts are by weight):

| | Parts |
|---|---|
| GR-S synthetic rubber | 100 |
| MT thermal black | 20 |
| Altax | 1 |
| Thionex | 0.3 |
| Zinc oxide | 5 |
| Stearic acid | 10 |
| Softening oil | 40 |
| Sulfur | 2.5 |
| N-nitroso triacetone amine | 4 |
| Sulfanilic acid | 2 |

One and four tenths ounces of the above mix was placed in a mold of eight cubic inches capacity and of intricate design. The mold was closed and heated at 150° C. for 15 minutes. A cellular product conforming to all the intricacies of the mold was produced. The product had a good tensile strength and a density of about 18 pounds per cubic foot.

Example 15

The following formulation was prepared by standard procedures (parts are by weight):

| | Parts |
|---|---|
| GR-S synthetic rubber | 100 |
| RMF furnace black | 10 |
| Mercaptobenzothiazole | 5 |
| Zinc oxide | 5 |
| Stearic acid | 5 |
| Circo oil (softener) | 40 |
| RPA No. 5 (peptizer) | 3 |
| Sulfur | 3 |
| ENDA (80%) | 5 |

One and six tenth ounces of the above formulation was placed in the mold of Example 14. The mold was closed and heated to 140° C. and maintained at this temperature for 30 minutes. Here the mercaptobenzothiazole acts as both a mild vulcanization accelerator and as a promoter for the decomposition of ENDA, this latter affect being augmented by the stearic acid present (as is also the case in Example 14). A cellular product conforming to all intricacies of the mold was produced which exhibited good tensile strength and tear resistance. The material weighed about 20 pounds per cubic foot.

Example 16

The following formulation was prepared by standard procedures (parts are by weight):

| | Parts |
|---|---|
| Natural rubber | 100 |
| Zinc oxide | 10 |
| Stearic acid | 2 |
| Mercaptobenzothiazole | 3.5 |
| Sulfur | 2.5 |
| ENDA (80%) | 5 |

One ounce of the above formulation was blown in the mold of Example 14 for 20 minutes at 140° C. An excellent product having a density of about 13.5 pounds per cubic foot was obtained. However, the blowing of a natural rubber formulation similar to that shown above is simple and is not a critical demonstration of the excellence of the blowing agents of my invention since rather imperfect agents give satisfactory expanded products with conventional rubber formulations. However, it is to be noted that the acid promoted blowing agents of my invention are sufficiently powerful to blow high sulfur (35 parts sulfur per 100 parts rubber, for example) natural rubber formulations into rigid dimensionally stable expanded ebonite.

The foregoing illustrative but non-limiting examples describe the use of representative acid promoted N-nitroso beta amino ketones as blowing agents. Other N-nitroso beta amino ketones than those specifically mentioned in the examples may be employed for the purpose; a number additional examples of specific N-nitroso beta amino ketones will be found in my copending application, previously referred to.

The foregoing illustrative but non-limiting examples describe the preparation of cellular products from a representative selection of plastic materials by the practice of my invention. Obviously, other plastic materials may be employed if desired such as reclaimed natural rubber, reclaimed synthetic rubber, urea-formaldehyde resins, polystyrenes and the like.

Be it remembered, that while my invention has been described by means of numerous examples thereof, these are illustrative and non-limiting and it is to be understood that my invention covers all changes and modifications of the examples thereof, herein chosen for purposes of disclosure, that do not constitute departures from the spirit and scope of my invention.

I claim:

1. In a process for the production of plastic materials in cellular form, the steps including mixing polyvinyl chloride and a N-nitroso beta amino ketone selected from the group consisting of N-alkyl N-nitroso diacetone amines and N-nitroso triacetone amine and an acidic substance in an amount sufficient to accelerate the thermal decomposition of the N-nitroso beta amino ketone, heating the resulting mixture to cause decomposition of the N-nitroso beta amino ketone with the generation of nitrogen and allowing the nitrogen to expand the mixture to produce a cellular structure.

2. The process of claim 1, further characterized by the fact that said N-nitroso beta amino ketone is N-methyl N-nitroso diacetone amine.

3. The process of claim 1, further characterized by the fact that said N-nitroso beta amino ketone is N-ethyl N-nitroso diacetone amine.

4. The process of claim 1, further characterized by the fact that said N-nitroso beta amino ketone is N-isopropyl N-nitroso diacetone amine.

5. The process of claim 1, further characterized by the fact that said N-nitroso beta amino ketone is N-nitroso triacetone amine.

References Cited in the file of this patent

UNITED STATES PATENTS 2,491,709    Brigg et al. _____ Dec. 20, 1949

OTHER REFERENCES

Jones et al.: The Catalytic Decomposition of Nitroso Beta-Alkylamino Ketones, Journal of the Chemical Society (London, 1933, pages 363–368.

India Rubber World, June 1947, page 369.